United States Patent [19]

Sun et al.

[11] 3,895,287

[45] July 15, 1975

[54] LOW COST VOLTAGE REGULATING RELAY

[75] Inventors: Shan C. Sun, Pittsburgh; Leonard C. Vercellotti, Verona, both of Pa.

[73] Assignee: Westinghouse Electric Corporation, Pittsburgh, Pa.

[22] Filed: May 30, 1974

[21] Appl. No.: 475,334

[52] U.S. Cl. ............ 323/20; 317/DIG. 5; 318/624; 323/43.5 R
[51] Int. Cl. ................................................ G05f 1/00
[58] Field of Search............ 323/43.5 R, 47, 80, 91, 323/19, 20; 317/DIG. 5; 318/502, 624, 663; 322/71; 307/235 R; 328/143

[56] References Cited
UNITED STATES PATENTS

| | | | |
|---|---|---|---|
| 3,482,116 | 12/1969 | James | 307/235 R |
| 3,704,404 | 11/1972 | Iversen | 318/624 |
| 3,725,771 | 4/1973 | Gilmore | 318/624 |
| 3,736,486 | 5/1973 | Gould et al. | 318/624 |
| 3,836,790 | 9/1974 | Becker | 307/235 R |

OTHER PUBLICATIONS

Brown Boveri Rev. 8/9-70, Vol. 57, pp. 327-333.

Primary Examiner—William H. Beha, Jr.
Attorney, Agent, or Firm—J. L. Stoughton

[57] ABSTRACT

A voltage regulating relay in which the dead-band voltage width is determined by the amplification of the difference or error signal supplied to a comparator which maintains constant upper and constant lower comparing voltages.

15 Claims, 2 Drawing Figures

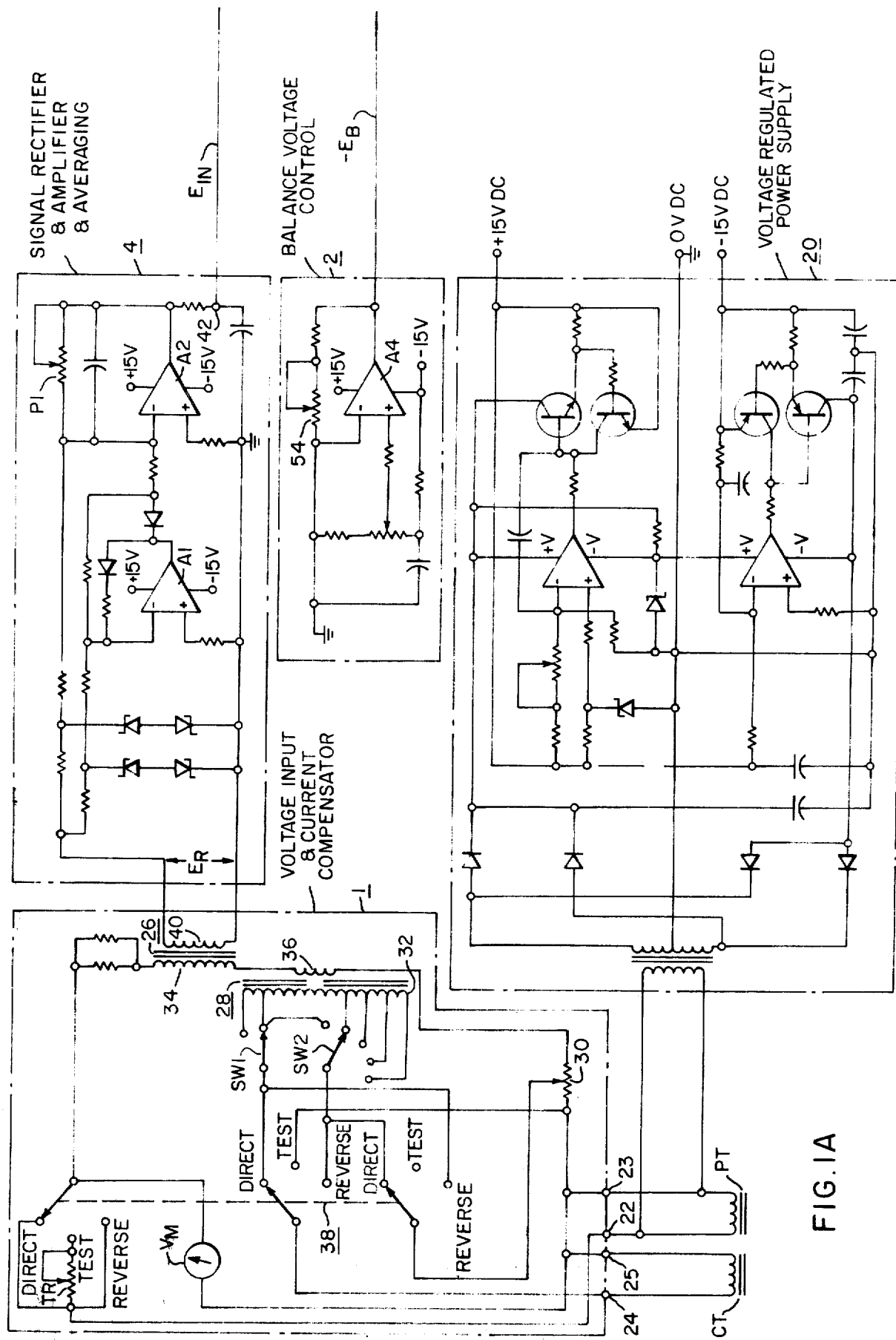
FIG. IA

LOW COST VOLTAGE REGULATING RELAY

BACKGROUND OF THE INVENTION

Static voltage regulating relays are known in the art. Such relays, for example, are shown and described in U.S. Pat. Nos. 3,418,539 to R. J. Sullivan and 3,721,894 to R. W. Beckwith. Both the Sullivan and the Beckwith relays rely on the voltage established by a Zener diode to determine the dead-band width. This voltage will change somewhat in accordance with the current which flows therethrough so that a change in the dead-band width will not be entirely independent of the voltage control and vice versa.

In accordance with the teachings of this invention, a highly accurate voltage source is provided to establish an upper and a lower voltage of fixed magnitude in a comparator network. This network is supplied with an amplified error signal which actuates first and second output circuits when the magnitude of the error signal becomes less than the lower comparing voltage magnitude or greater than the upper comparing voltage magnitude. The actual width of the dead-band of the regulated or controlled voltage is determined, not by changing the upper and lower voltage magnitudes, but by altering the amplification of the error signal obtained by comparing the voltage magnitude of the input voltage signal with a reference voltage. The balance voltage is determined by controlling the magnitude of the reference voltage. With this arrangement, the balance voltage control and the deadband width voltage control are completely independent of each other.

BRIEF DESCRIPTION OF THE DRAWING

FIGS. 1A and 1B together schematically illustrate a voltage regulating relay embodying the invention.

DESCRIPTION OF THE PREFERRED EMBODIMENT

Figure 1B:
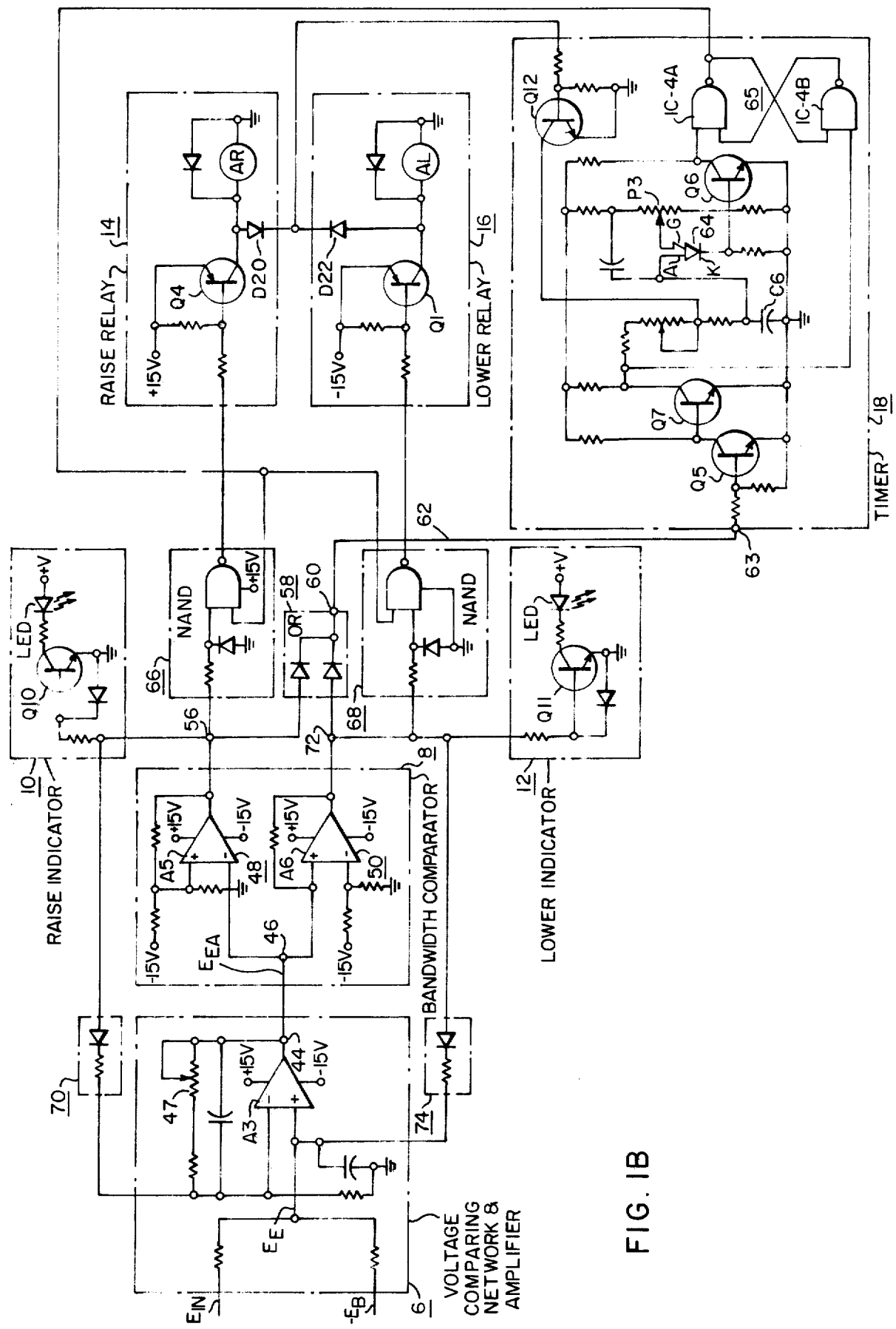

Referring to the drawing by characters of reference, numeral 1 indicates a voltage input and current compensator, numeral 2 indicates a balance voltage control, numeral 4 indicates a signal rectifier and amplifier, numeral 6 indicates a voltage comparing network and amplifier, numeral 8 indicates a bandwidth comparator, numeral 10 indicates a raise indicator, numeral 12 indicates a lower indicator, numeral 14 indicates a raise relay, numeral 16 indicates a lower relay, numeral 18 indicates a timer, and numeral 20 indicates a voltage regulated power supply.

The voltage input and current compensator 1 is conventional and comprises a pair of voltage quantity input terminals 22 and 23 and a pair of current quantity input terminals 24 and 25 which are shown as being energized from a potential transformer PT and a current transformer CT; the transformers PT and CT being energized from the output voltage and current of a power transformer having voltage controlling taps in the manner well known to those skilled in the art.

The voltage input and current compensator 1 comprises a transformer 26, a reactance compensator 28 and a loading resistor 30 of an ohmic resistance representing the resistance of the conductor from transformer to the load. The compensator 28 is similar to a transformer but is provided with an air gap in its iron core and provides an output voltage which is shifted in phase with respect to the current flowing through its primary winding 32 of an inductive reactance representing that of the conductor from transformer to load. The primary winding 34 of the transformer 26, the secondary winding 36 of the reactance compensator 28 and the loading resistor 30 are connected in series between the potential quantity input terminals 22 and 23. A selected portion of the primary winding 32 of the compensator 28 and of the resistor 30 to properly represent the characteristic of the line between the transformer and the load are connected in series with the current quantity input terminals 24 and 25. A pair of switches SW1 and SW2 determines the magnitudes of the voltage induced in the winding 36 with respect to the magnitude of the current supplied to the current quantity input terminals 24–25. It will be appreciated that the primary winding 34 of transformer 26 is energized with a voltage quantity which is the phasor sum of the potential and current quantities supplied to the potential and current transformers PT and CT. A switch 38 is utilized to control the relative polarity of the outputs of the transformers CT and PT and the winding 40 in the usual manner. This switch 38 is provided with a test position in which a rheostat TR may be adjusted to provide a continuously adjustable voltage to winding 34 for test purposes. A voltmeter $V_M$ is provided to indicate the value of the test voltage.

An alternating voltage quantity $E_R$ is induced in the secondary winding 40. This alternating quantity $E_R$ is rectified, amplified and averaged in the rectifier and amplifier 4 and appears at its output terminal 42 as a DC voltage quantity $E_{IN}$ of a magnitude suitable for use in controlling operational amplifiers. This quantity $E_{IN}$ is added to a voltage quantity $-E_B$ (suitable in magnitude for use with operational amplifiers) and which is furnished by the balance voltage control 2. The quantities $E_{IN} + [-E_B]$ are added together to provide the quantity $E_E$. This quantity $E_E$ is amplified to provide the error signal $E_{EA}$ at the output terminal 44.

The error signal $E_{EA}$ is supplied to the input terminal 46 of the bandwidth comparator 8. The lower and upper limit comparator networks 48 and 50 include operational amplifiers A5 and A6. A first one of the input terminals of each of the amplifiers A5 and A6 is biased by a fixed voltage. A second input terminal of each operational amplifier A5 and A6 is connected to the bandwidth comparator input terminal 46. The raise or lower limit comparator network 48 has its positive input terminal of its operational amplifier A5 fixedly biased while the lower or upper limit network 50 has the negative input terminal of its operational amplifier A6 fixedly biased. The dead-band width may, for example, be 2 to 8 volts. when the magnitude $E_{IN}$ varies from the balance voltage $E_B$ less than this amount, neither of the comparator networks 48 and 50 is actuated.

The width of the dead-band is determined by the amplification provided by adjusting the amplification control 47 of the voltage comparing network and amplifier 6. For purposes of illustration it will be assumed that the positive input terminal of the operational amplifier A5 of the comparator network 48 is biased to −1.5 volts, the negative input terminal of the operational amplifier A6 of network 50 is biased to +1.5 volts and a dead-band width of 6 volts is desired in the compensated output voltage of the controlled power supply transformer. when the magnitude of $E_{EA}$ varies more than ± 1.5 volts, the raise or lower relay 14 or 16 will be actuated. Assuming a balance voltage $E_B$ 9.0 volts and that the amplification control 47 is set to provide an amplification factor of 6.67 and a ratio of 0.075 between the compensated output voltage and the voltage $E_{IN}$, a variation of the compensated output voltage of the power transformer greater than ± 3 volts will cause the error voltage of $E_E$ to vary ±.225 volts. Since an application factor of 6.67 has been assumed this variation of $E_E$ will cause $E_{EA}$ to vary ± 1.5 volts. When ± $E_{EA}$ exceeds this value, one of the raise or lower relays 14 or 16 will be actuated to adjust the tap changer to bring the magnitude of the output voltage of the controlled power transformer within the dead-band.

If the amplification control 47 is reset to provide a greater amplification, the result will be a reduction in the dead-band width. For example, assume that the amplification factor is increased to 10. Under this condition, in the magnitude of the compensated voltage $E_E$ which results in a voltage change of $E_{EA}$ between ± 1.5 volts is only ± 2 volts instead of ± 3 volts (with the 6.67 amplifications factor) whereby the width of the dead-band decreases from 6 to 4 volts. Similarly, if the amplification factor is decreased to 5, the compensated voltage will need to change ± 4 volts to cause a 35 1.5 volt change in $E_{EA}$ resulting in a dead-band width of 8 volts.

The balance voltage control 2 is provided with an output voltage control 54 which controls the magnitude of the center voltage of the dead-band. For example, assume a magnitude of the voltage $E_B$ of 9.0 volts and a voltage ratio between the magnitude of the compensated voltage derived from the controlled power transformer and the voltage $E_{IN}$ of 0.075 as above, a compensated output voltage of the power transformer of 120 volts will provide a voltage $E_{IN}$ of +9.0 volts. This results in a voltage $E_E$ of O volts. A change in magnitude of the compensated voltage of the power transformer of ± 3 volts produces a change in magnitude of $E_{IN}$ of ± 0.225 volts. Assuming an amplification factor of 6.67 as before, the required ± 1.5 volts to open the raise and lower relays 14 and 16 will be obtained when the balance voltage 120 volts is midway between 123 and 117 volts.

If the output voltage control or potentiometer 54 is adjusted to increase the output voltage $E_B$ to 9.75 volts and the power transformer compensated output voltage increases to 130 volts, the magnitude of the voltage $E_{IN}$ will be 9.75 volts. The magnitude of the voltages $E_E$ and $E_{EA}$ will be 0 volts since $E_E = E_{IN} - E_B$ as set forth above. Again, assuming the same amplification factor of 6.67, a change in magnitude of the compensated voltage of ± 3 volts, will provide a change in the magnitude of $E_E$ between 9.975 and 9.525 volts. The magnitude of the voltage $E_{EA}$ will vary ± 1.5 volts, thereby establishing a new balance voltage of 130 volts. Similarly, if the output voltage control 54 is adjusted to decrease the output voltage to 8.4 volts, the compensated voltage will vary between 109 and 115 volts, which is ± 3 volts from a balance voltage of 112 volts.

The signal rectifier and amplifier 4 includes operational amplifiers A1 and A2 and their associated circuitry as illustrated to provide a precision of full wave rectification, amplification and averaging. The incoming alternating polarity signal from the transformer 26 is rectified by the operational amplifier A1 and is supplied to the negative input terminal of the operational amplifier A2. The signal is amplified, averaged and supplied to the output terminal 42. The rheostat P1 is used for trimming the overall conversion gain. The balance voltage control 2 may take any form, but is shown as including an operational amplifier A4 having a feedback control rheostat which provides the adjustable part of the output voltage control 54. The voltages $E_{IN}$ and $-E_B$ are supplied through an adding circuit to the positive input terminal of an operational amplifier A3 in the voltage comparing network and amplifier 6. The output voltage as controlled by the output voltage control 47 is supplied to the output terminal 44 as the voltage $E_{EA}$ to the input terminal 46 of the bandwidth comparator 8. As long as the voltage $E_{EA}$ is within the dead-band limits, as above described, the operational amplifiers A5 and A6 of the comparator networks 48 and 50 will not provide output signals since no tap changing adjustments are needed. If, however, the magnitude of the quantity $E_{EA}$ becomes sufficiently negative, the operational amplifier A5 of the comparator network 48 will be switched on to provide an output signal therefrom to the input terminal of an OR network 58 which provides an output signal at its output terminal 60. This signal is supplied through a conductor 62 to the input terminal 63 of the timer 18. This signal causes the transistor Q5 to turn on and remove the base current from the transistor Q7. Q7 stops conducting and the shorting circuit around the timing capacitor C6 is removed. When this occurs, the capacitor C6 begins to charge at a controlled rate as determined by the magnitudes of the resistors connected in series therewith. At the end of a predetermined time interval, this capacitor C6 receives its critical charge, the magnitude of which is determined primarily by setting of the potentiometer P3 of the timer 18. When this critical charge is reached, the potential between the anode A and the cathode K of the programmable unijunction transistor 64 will cause the transistor 64 to conduct and render the normally blocked transistor Q6 conducting to actuate the flip-flop network 65 comprising the NAND networks IC-4A and IC-4B. The flipping of network 64 provides a logical 1 signal to the NAND networks 66 and 68. This logical 1 signal to the NAND network 68 is without effect since at this time no logical 1 signal is being applied thereto from the comparator network 50. This logical 1 signal provides the second logical 1 signal to the NAND network 66 (the first having been supplied by the comparator network 48) to provide signal to the raise relay device 14 which causes the transistor Q4 to conduct and energize the relay AR causing the tap changing device to operate and increase the output voltage of the power transformer.

Conduction of the transistor Q4 of the raise relay 14 also causes the transistor Q12 to conduct and rapidly discharge the timing capacitor C6 and thereby preventing any further unwanted conduction of the transistor 64. This insures a substantially full timing operation for each tap change.

The output signal of the comparator network 48 is also supplied to cause the transistor Q10 of the raise indicator network 10 to conduct and energize the light-emitting diode LED to provide a visual indication of the existence of an out-of-band condition of the output voltage of the power transformer. The output signal of the comparator network 48 is also supplied through a hysteresis network 70 to negative input terminal of the operational amplifier A3. This voltage provided by the hysteresis network 70 acts to raise the magnitude of the voltage supplied to the positive input terminal of the operational amplifier A3 so that once the $E_{EA}$ signal actuates the comparator network 48, it will stay actuated for a tap changing operation even though the magnitude of the $E_E$ voltage signal, and consequently, the $E_{EA}$ voltage signal may decrease slightly in magnitude.

A suitable voltage regulated power supply 20 is schematically illustrated. Any accurately regulated power supply may be utilized which will provide an accurately maintained voltage to the balance voltage control 2 and to the timer 18. A further description of the details of the supply 20 is not believed necessary for the understanding of this invention.

When the voltage rises beyond the upper limit of the dead-band, the tap on the transformer should be changed to provide for lowering the output voltage of the power transformer. When this occurs, the comparator network 50 provides a signal at the terminal 72, which actuates the OR network 58 in the same manner as the logical 1 signal at the terminal 56. The resulting signal at the output terminal 60 of the OR network actuates the timer 18 as described above in connection with an operation of the raise comparator network 48. When the timer 18 times out, the flip-flop network 64 flips and a logical 1 signal is again applied to the NAND networks 66 and 68. In this case, however, the NAND network 66 has no logical 1 input signal at its other input terminal, but the NAND network 68 is provided by this second signal from the terminal 72 and the transistor Q1 of the lower relay 16 conducts to energize the lower relay AL which operates the tap changer to lower the output voltage of the power transformer. As described above in connection with the raise operation, a signal is applied to cause the transistor Q12 to conduct and rapidly discharge the timing capacitor C6. The signal at the terminal 72 also causes conduction of a transistor Q11 of the lower indicator network and the energization of the light-emitting diode LED thereof. This indicates that the output voltage of the power transformer has exceeded the upper limit of the dead-band and a lowering operation is in progress. A hysteresis network 74 connected between the terminal 72 and the plus terminal of the amplifier A3 temporarily slightly reduce the upper limit of the dead-band.

What is claimed and is desired to be secured by United States Letters Patent is as follows:

1. A voltage regulating relay comprising means deriving a reference voltage, a sensing circuit to be supplied with a regulatable voltage the magnitude of which is to be maintained within a desired bandwidth, said bandwidth being that voltage magnitude which lies between an upper voltage magnitude and a lower voltage magnitude, a voltage comparing network having first and second input circuits and an output circuit, said first input circuit being connected to said sensing circuit or energization with a first input quantity representing the magnitude of said regulatable voltage, said second input circuit being connected to said reference voltage means for energization by a second input quantity representing the magnitude of said reference voltage, said comparing network acting to provide an output quantity at its said output circuit with respect to an established reference which represents the difference in the magnitude between said first and second input quantities, a voltage bandwidth comparator having a plurality of input circuits and a pair of output circuits, a first of said input circuits of said bandwidth comparator being connected to said output circuit of said voltage comparing network for energization with a third quantity having a magnitude with respect to said established reference which is representative of the magnitude of said output quantity of said voltage comparing network, means supplying first and second control quantities to a second and a third of said input circuits of said comparator, said first control quantity having a first magnitude with respect to said established reference, said second control quantity having a second magnitude with respect to said established reference, said bandwidth comparator having means changing the energized condition of a first of its said output circuits when the magnitude of said third quantity becomes greater than the magnitude of said first control quantity and having means changing the energized condition of a second of its said output circuits when the magnitude of said third quantity becomes less than the magnitude of said second control quantity, and bandwidth control means establishing a desired voltage relationship between the magnitude of said output quantity of said comparing network and the magnitude of said difference in magnitude between said first and second input quantities.

2. The relay of claim 1 in which said bandwidth control means is adjustable to vary the magnitude of said desired voltage relationship thereby to vary the magnitude of said bandwidth voltage.

3. The relay of claim 1 in which said comparator is provided with a third output circuit the energization of which is changed whenever the energization of at least one of said pair of output circuits is changed, said comparing network is provided with a third input circuit connected to said third output circuit of said comparator, said comparing network acting to alter the magnitude of said desired voltage relationship thereby to vary the magnitude of said bandwidth voltage.

4. The relay of claim 3 in which said comparator changes the energization of said output circuit whenever the energization of either said output circuit of said pair of output circuits is changed.

5. The relay of claim 4 in which said comparing network acts to increase the magnitude of said desired voltage relationship thereby to reduce the magnitude of said bandwidth voltage.

6. The relay of claim 1 in which said comparing network comprises an operational amplifier having a non-inverting and an inverting input terminal and an output terminal, a unidirectional potential source having a plus terminal and a negative terminal and an intermediate terminal the potential of which is intermediate that of said positive and said negative terminals, said non-inverting terminal being connected in quantity combining relationship to said first and said second input circuits of said comparing network, first feedback impedance means connecting said amplifier output terminal to said inverting input terminal, second feedback impedance means connecting one of said pair of output circuits to one of said input terminals of said amplifier, and third impedance means connecting the other of said pair of output circuits to the other of said input terminals of said amplifier.

7. The relay of claim 6 in which said one output circuit of said comparator is its said first output circuit, and said one input terminal of said amplifier is said inverting terminal.

8. The relay of claim 7 in which said connection of said second feedback means includes means to prevent energization of said inverting input terminal unless said comparator has changed the energized condition of its said first output circuit, said connection of said third feedback means includes means to prevent energization of said noninverting terminal unless said comparator has changed the energized condition of its said second output circuit.

9. A voltage regulating relay assembly, said assembly comprising a voltage comparing network, a comparator, a unidirectional potential power supply, said comparing network including a first operational amplifier, said comparator having a second and a third operational amplifier, each said amplifier having an inverting and a non-inverting input terminal and an output terminal, said power supply including first and second and third power supply terminals, the potential of said first power supply terminal being positive with respect to that of said second power supply terminal and the potential of said third power supply terminal being negative with respect to that of said second power supply terminal, circuit means connecting said power supply to said amplifiers, a first impedance connecting a first of said input terminals of said first amplifier to said second power supply terminal, a second impedance connecting said output terminal of said first amplifier to said inverting terminal of said first amplifier, said comparing network having first and second input voltage supply terminals and an output voltage supplying terminal, a third impedance connecting one of said input terminals of said first amplifier to said first input voltage supply terminal, a fourth impedance connecting said second input voltage supply terminal to a selected said input terminal of said first amplifier, a first voltage divider connected between a first pair of said power supply terminals and having an intermediate point connected to a first of said input terminals of said second amplifier, a fifth impedance connecting said output terminal of said second amplifier to said non-inverting input terminal of said second amplifier, means including a sixth impedance connecting said output terminal of said first amplifier to a selected said input terminal of said second amplifier, a second voltage divider connected between one pair of said power supply terminals and having an intermediate point connected to a first of said input terminals of said third amplifier, a seventh impedance connected between said output terminal of said third amplifier and one of said input terminals of said third amplifier, means including an eighth impedance connecting said output terminal of said first amplifier to a selected said input terminal of said third amplifier.

10. The relay assembly of claim 9 in which said selected input terminal of said second amplifier is its said one input terminal and said selected input terminal of said third amplifier is its said one input terminal.

11. The relay assembly of claim 9 in which said one input terminal of said second amplifiers is its said inverting input terminal, said first terminal of said second amplifier is its said non-inverting input terminal, said first input terminal of said third amplifier is its said inverting input terminal and said one input terminal of said third amplifier is its said non-inverting input terminal.

12. The relay assembly of claim 9 in which said selected input terminal of each of said amplifiers is its said one input terminal and in which said first input terminal of each of said amplifiers is the other of its said input terminals.

13. The relay assembly of claim 12 in which said one input terminal of each of said amplifiers is its said non-inverting input terminal and said other input terminal of each of said amplifiers is its said inverting input terminal.

14. The relay assembly of claim 13 which includes first and second indicating means, said first indicating means being connected to said second amplifier and effective to indicate the operating condition thereof, said second indicating means being connected to said third amplifier and effective to indicate the operating condition thereof.

15. The relay assembly of claim 13 which includes and OR network having a pair of input terminals and an output terminal, first and second NAND networks, each said NAND network having a pair of input terminals and an output terminal, a timer connected between said output terminal of said OR network and a first of said pair of input terminals of each of said NAND networks, said timer being effective to supply a logical 1 signal to said first input terminal of said NAND networks subsequent to a desired interval following the application of a logical 1 signal thereto from said OR network, said second amplifier having its said output terminal connected to a second of said input terminals of a first of said NAND networks and of said OR network and effective to supply a logical 1 signal thereto solely when the magnitude of the output quantity at said output terminal of said first amplifier is less than a first predetermined magnitude, said third amplifier having its said output terminal connected to a second of said input terminals of a second of said NAND networks and of said OR network and effective to supply a logical 1 signal thereto solely when the magnitude of said output quantity is greater than a second predetermined magnitude.

* * * * *